Oct. 10, 1933.  C. A. MUDGE  1,929,787
POLE PIECE
Filed Jan. 18, 1930
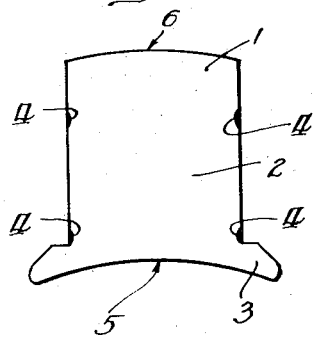
Fig. 1.
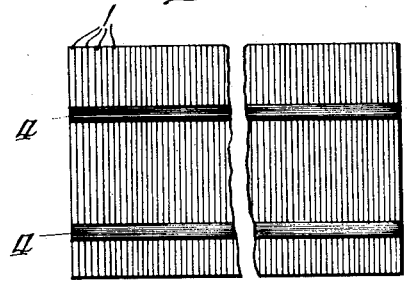
Fig. 2.
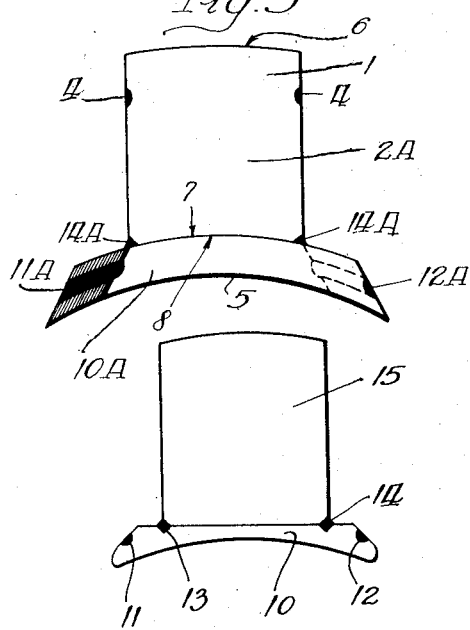
Fig. 5.
Fig. 3.
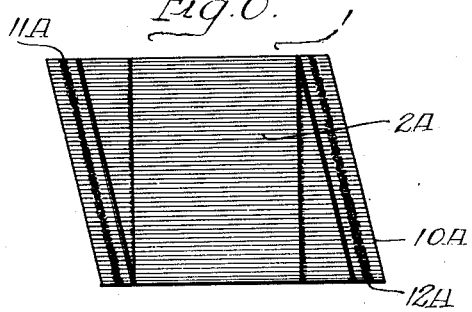
Fig. 6.
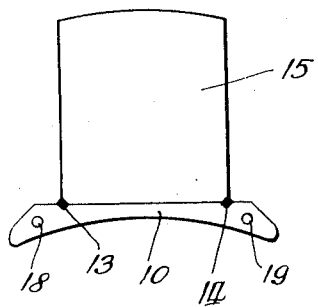
Fig. 4.
Inventor:
Charles A. Mudge.
By Brown Jackson Boettcher & Dienner
Attys.

Patented Oct. 10, 1933

1,929,787

UNITED STATES PATENT OFFICE 1,929,787

POLE PIECE

Charles A. Mudge, Elizabeth, N. J., assignor to Electro Dynamic Company, Bayonne, N. J., a corporation of New Jersey Application January 18, 1930. Serial No. 421,637

5 Claims. (Cl. 171—252)

This invention relates primarily to the construction of pole pieces in general, and more particularly to such pole pieces as are used on dynamo electric machines. The principles of the present invention are also applicable to other magnetic or electro-magnetic structures.

It is customary to make the poles of dynamo electric machines of thin laminations chiefly in order to reduce the eddy current losses therein. It is one of the objects of the present invention to provide an improved method and means for securing the laminations together without the use of rivets, thereby obviating the necessity for rivet holes in the laminations and saving in the cost of the dies and in the maintenance thereof. This is accomplished by making the laminations imperforate and securing them together by welding. Where the pole piece comprises a solid core and laminated pole shoes the pole shoes are preferably, although not necessarily, secured together by welding and are then welded to the pole core. I do not intend to be limited to the particular method herein disclosed although it has advantages over other methods.

The attainment of the above and other objects of the present invention will be apparent from the following specification taken in conjunction with the accompanying drawing forming a part thereof.

In the drawing:

Figure 1 is an end view of a pole piece for a dynamo electric machine, constructed in accordance with my invention;

Figure 2 is a side view of the pole piece;

Figure 3 is an end view of a modified form of a pole piece;

Figure 4 is an end view of a still different construction;

Figure 5 is a side elevation of a modified form of a pole piece employing a skewed pole shoe, and Figure 6 is a top plan view of the same.

Referring now more particularly to the construction shown in Figures 1 and 2 the pole piece comprises a number of thin, flat, imperforate laminations 1, having a core portion 2 and a pole shoe portion 3 integral therewith. Each of the laminations 1 has a number of notches 4 formed therein during the punching of the metal. The laminations, which are identical, are stacked one upon another in a suitable assembly fixture to bring them into the desired register with each other and are then compressed and welded together as by depositing welding metal in the groove formed by the notches 4. It will be observed that the laminations may be made to overlap in a skewed arrangement so that, for example, the cross-section is somewhat diamond shaped. The notches register, whether the pieces are skewed or straight.

Obviously, the laminations shown in side elevation in Figure 1 may be skewed with respect to each other, so that both the core and the shoe are skewed. This is possible because the two surfaces, namely, the pole shoe surface 5, facing the armature and the end surface 6, which is secured inside of the field yoke ring, are coaxial cylindrical surfaces. However, such skewing of the entire pole piece results in a diamond shaped core section which calls for a special shaped coil.

The preferred method of securing the skewed pole shoe is shown in Figures 5 and 6.

Two separate laminations are formed, namely, the laminations 2—A forming the core portion and the laminations 10—A, forming the shoe, or tip portion. The upper and lower ends of the core portion 2—A are cut on concentric circles to give the cylindrical edges 6 and 7. The top and bottom edges of the pole shoe portion 10—A are likewise cut on concentric circles to provide the cylindrical top and bottom edges 8 and 5 which are coaxial with the edges 7 and 6 of the core portion.

The laminations 10—A are assembled in skewed relation, as may be seen in Figures 5 and 6, and are compressed and joined together in such skewed relation by the line of welding indicated at 11—A and 12—A, thereby holding the laminations of the tip, or shoe portion, firmly together. Likewise, the laminations for the core portion are compressed and welded along the lines of welding 4—4. A line of welding 14—A then joins the pole core portion 2—A with the tip portion 10—A. This leaves the pole portion 2—A rectangular in cross-section to receive the core, and makes the pole shoe skewed to provide noiseless operation of the motor as well as to provide a more uniform torque on the periphery of the armature. Thereby, the conductors on the armature cut into the pole flux more uniformly, or gradually give a uniform increase of voltage as measured from bar to bar on the commutator.

Instead of forming the pole portion 2—A of laminations, it may be formed of a solid piece, as shown in Figures 3 and 4. In that case the pole shoe laminations are assembled and welded together in skewed relation and then the solid pole piece is pressed against the top surface 3 and welds made as at 14—A—14—A.

While the welding may be done in any desired manner I prefer to use a metal electrode and form a line of welding in the groove formed by the registering notches 4 in the laminations. The welding metal preferably falls short of filling the groove. It is possible to weld the laminations together in any other known manner. I prefer to use the ordinary process of arc and metal electrode, progressively forming the weld in the groove. Gas welding may be employed. The welding acts as a bond on the surface of the laminations and, from tests, has been found to be a perfectly satisfactory means for securing the laminations together.

The welding metal may be made of relatively high resistance and relatively low reluctance. By depositing the weld in the grooves the advantage of accurate location is secured and the further advantage of leaving the face of the core without any projections which would interfere with mounting the field pole winding thereupon.

It is, in fact, easier to weld the parts together than it is to pass a number of rivets through perforations in the pole pieces and then rivet them up as is done in the prior art. My process leaves no projections anywhere and hence the field spools may be made to fit snugly and at the same time are easily adjusted into place.

Pole pieces are sometimes made with a solid core structure and a laminated pole shoe structure. Such an arrangement is shown in Figures 3 and 4. The pole shoe 10 of Figure 3 comprises a number of thin laminations, each comprising a sheet metal stamping having two rows of notches 11 and 12 formed therein during the stamping process, these notches registering to form transverse grooves.

The laminations are piled on top of each other either in accurate register or skewed if desired, compressed, and welded together by means of an arc and a metal electrode which fills the groove formed by the rows of notches 11 and 12. Each of the laminations 10 is also provided with another pair of notches 13 and 14 likewise formed during the punching process. When the pole shoe has been assembled and the laminations welded together, the assembled pole shoe is pressed and held against the end of a solid core 15 and it is welded thereto at the indentations 13 and 14 by means of a metal electrode in the same manner that the laminations were secured together.

The edges of the core 15 may be chamfered off so that the lines of welding metal 13—14 may be deposited below the projected planes of the adjacent surfaces of the pole piece 15 and shoe 10. Thus no interference with the spool of the spool of the field winding is caused. It will be observed that the cross section of the weld is small and is very definitely controllable.

If desired the laminations of the pole shoe may be secured together by means of rivets 18 and 19 as shown in Figure 4 and then welded to the solid core structure 15 in the same manner that the assembled pole shoe of Figure 3 is welded to the core.

In such a construction the laminations comprising the pole shoe are of course provided with perforations for receiving the rivets 18 and 19.

I do not intend to limit the invention to the exclusive use of welds for holding the laminations together whether the pole be formed completely of laminations, as shown in Figures 1 and 2 or partially as shown in Figures 3 and 4.

The laminations comprising the pole shoes of Figures 3 and 4 may be made of sheet strip steel rather than cut out of a big plate, and consequently the cost of the die for the laminated part would be much less than if the whole section of the pole were made by the die.

It will be observed that the welds are formed on the back side of the laminated pole shoes 10 and hence are in better location with respect to flux pulsations than any rivets such as 18—19 can be.

The method of securing the edges together permits a greater freedom of design without added cost, as a rectangular or skewed pole or shoe may be made from identical stampings merely by the manner of assembling.

After the pole pieces are formed as shown they are drilled and tapped at their upper ends for receiving cap screws or studs to fasten them into a field frame, as disclosed in my copending application Serial No. 421,991, filed January 20, 1930.

Welding at the edges is a highly satisfactory method because the edges are clean freshly cut metal. The notches providing the grooves are formed preferably by the same operation whereby the individual stampings are punched out, or may be cut afterwards either by separate operations on the plates or by cutting a groove in a group of assembled punchings.

While I have herein shown and described a few preferred embodiments of my invention, it is to be understood that the invention is not limited to the precise constructions herein shown, the same being merely illustrative of the invention.

What I consider new and desire to secure by Letters Patent is:

1. In a dynamo electric machine, a pole comprising a core portion and a laminated pole shoe, the laminations being welded together and welded to the core portion.

2. A pole piece of the type adapted to receive a magnetizing winding thereon, said pole piece comprising a laminated core portion having a pole shoe at one end and adapted to receive the winding over the other end, the laminæ having registering notches at their edges to form grooves extending across the core portion, said laminæ being welded together across their edges by metal deposited and lying substantially entirely within the grooves, the outer surface of the welded metal being substantially flush with the outer surface of the core whereby the welded metal does not increase the outer dimension of the core around which the magnetizing winding is placed.

3. A pole piece of the type adapted to receive a magnetizing winding thereon, said pole piece comprising a laminated core portion having a pole shoe at one end and adapted to receive the winding over the other end, the laminæ having registering notches at their edges to form grooves extending across the core portion, said laminæ being welded together across their edges by metal deposited and lying substantially entirely within the grooves, the outer surface of the welded metal being substantially flush with the outer surface of the core whereby the welded metal does not increase the outer dimension of the core around which the magnetizing winding is placed, the pole shoe of the pole piece comprising a laminated structure with the laminæ welded together and to the core.

4. A pole piece of the type adapted to receive a magnetizing winding thereon, said pole piece comprising a laminated core portion having a pole shoe at one end and adapted to receive the winding over the other end, the laminæ having registering notches at their edges to form grooves extending across the core portion, said laminæ being welded together across their edges by metal deposited and lying substantially entirely within the grooves, the outer surface of the welded metal being substantially flush with the outer surface of the core whereby the welded metal does not increase the outer dimension of the core around which the magnetizing winding is placed, the pole shoe extending laterally of the core, and the laminæ of the pole shoe being welded together at the laterally extending portions thereof.

5. A pole piece of the type adapted to receive a magnetizing winding thereon, said pole piece comprising a laminated core portion adapted to receive the winding over one end, each lamina having a pole shoe portion formed integrally therewith at the other end, the laminæ having registering notches at their edges to form grooves extending across the core portion, said laminæ being welded together across their edges by metal deposited and lying substantially entirely within the grooves, the outer surface of the welded metal being substantially flush with the outer surface of the core whereby the welded metal does not increase the outer dimension of the core around which the magnetizing winding is placed.

CHARLES A. MUDGE.